(12) United States Patent
Wentz et al.

(10) Patent No.: US 11,456,865 B2
(45) Date of Patent: Sep. 27, 2022

(54) BIOMETRIC SCANNER APPARATUS AND METHODS FOR ITS USE

(71) Applicant: Ares Technologies, Inc., Cambridge, MA (US)

(72) Inventors: Christian Wentz, Providence, RI (US); Edward H Frank, Park City, UT (US)

(73) Assignee: Ares Technologies, Inc., Boston, MA (US)

( * ) Notice: Subject to any disclaimer, the term of this patent is extended or adjusted under 35 U.S.C. 154(b) by 84 days.

(21) Appl. No.: 16/682,704

(22) Filed: Nov. 13, 2019

(65) Prior Publication Data

US 2020/0153624 A1  May 14, 2020

Related U.S. Application Data

(60) Provisional application No. 62/760,836, filed on Nov. 13, 2018.

(51) Int. Cl.
| | |
|---|---|
| *H04L 9/08* | (2006.01) |
| *H04L 9/32* | (2006.01) |
| *G06F 21/34* | (2013.01) |
| *G06F 21/32* | (2013.01) |

(52) U.S. Cl.
CPC ............ *H04L 9/0866* (2013.01); *G06F 21/32* (2013.01); *G06F 21/34* (2013.01); *H04L 9/085* (2013.01); *H04L 9/3218* (2013.01); *H04L 9/3257* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 6,595,920 B2 | 7/2003 | Walton | |
| 8,577,091 B2 * | 11/2013 | Ivanov | G06K 9/00013 |
| | | | 382/115 |
| 8,762,723 B2 * | 6/2014 | Yu | H04L 9/0844 |
| | | | 713/169 |
| 2008/0222496 A1 * | 9/2008 | Tuyls | H04L 9/3231 |
| | | | 714/E11.032 |
| 2012/0297464 A1 * | 11/2012 | Busch | H04L 9/3236 |
| | | | 726/5 |

(Continued)

FOREIGN PATENT DOCUMENTS

CA          3004880 A1 *  5/2017  .......... H04L 9/0618

OTHER PUBLICATIONS

Hardware Vulnerabilities.

(Continued)

*Primary Examiner* — Wasika Nipa
*Assistant Examiner* — Mayasa A. Shaawat
(74) *Attorney, Agent, or Firm* — Caldwell Intellectual Property Law

(57) ABSTRACT

A biometric scanner apparatus comprising a biometric sensor configured to scan at least a biological sample and receive a unique biometric pattern, a secret data extractor configured to receive the unique biometric pattern from the biometric sensor and generate an output comprising a sample-specific secret, and a sample identifier circuit communicatively connected to the secret data extractor wherein the sample identifier circuit is configured to produce at least an output comprising a secure proof of the sample-specific secret.

17 Claims, 3 Drawing Sheets

(56) References Cited

U.S. PATENT DOCUMENTS

2017/0109512 A1* 4/2017 Bower .................. G06F 21/32
2020/0145206 A1* 5/2020 Cho ..................... H04L 9/3231

OTHER PUBLICATIONS

Grubel, et al; Silicon Photonic Physical Unclonable Function; Department of Electrical and Computer Engineering, Johns Hopkins University, Baltimore, Maryland 21218, USA.
Ruhrmair, et al; Security Applications of Diodes With Unique Current-Voltage Characteristics (Shrot Paper); Institute for Nanoelectronics, TU Munchen, Germany.
Roberts, et al; Using Quantum Confinement To Uniquely Identify Devices; Scientific Reports; Nov. 10, 2015.
Thomas R. Nelson, et al., Ultrasound Biosafety Considerations for the Practicing Sonographer and Sonologist, Journal, 2009.
Theo Vos, et al., Global, regional, and national incidence, prevalence, and years lived with disability for 310 diseases and injuries, 1990-2015: a systematic analysis for the Global Burden of Disease Study 2015, Oct. 8, 2016, vol. 388.
Guidance for Industry and FDA Staff, Information for Manufacturers Seeking Marketing Clearance of Diagnostic Ultrasound Systems and Transducers, Sep. 9, 2008.
Llewellyn C. Padayachy, Non-invasive intracranial pressure assessment, Jul. 21, 2016, Springer.
Uttio Roy Chowdhury, et al., Intracranial Pressure and Its Relationship to Glaucoma: Current Understanding and Future Directions, Oct. 2015.

* cited by examiner

BIOMETRIC SCANNER APPARATUS AND METHODS FOR ITS USE

CROSS-REFERENCE TO RELATED APPLICATIONS

This application claims priority to Provisional Application No. 62/760,836, filed on Nov. 13, 2018 and entitled "BIOMETRIC SCANNER APPARATUS AND METHODS FOR ITS USE," the entirety of which is incorporated herein by reference.

FIELD OF THE INVENTION

The present invention generally relates to the field of data storage of highly unique and identifying biometric samples. In particular, the present invention is directed to a biometric scanner apparatus and methods for its use.

BACKGROUND

Access to sensitive or confidential information generally requires authentication of a user's identity. Authentication may be performed by methods such as passwords, security tokens and biometrics. Passwords are easy to implement but are frequently forgotten and can be spoofed. Security tokens can be unwieldy because they require coordination between devices and are still prone to some attacks. Biometrics theoretically provide a higher level of security as compared to passwords or security tokens because they are generated by a user's unique biological features, and unlike a security token cannot be misplaced. However, to be useful, biometric patterns must be reproducible, and once scanned, such patterns are as easily spoofed as passwords; moreover public faith in the promise of biometrics can lead to a false sense of security.

SUMMARY OF THE DISCLOSURE

In an aspect, a biometric scanner apparatus includes at least a biometric sensor, the at least a biometric sensor configured to scan at least a biological sample and receive a unique biometric pattern, a secret data extractor, wherein the at least a secret data extractor is configured to receive the unique biometric pattern from the biometric sensor and generate an output comprising a sample-specific secret, and a sample identifier circuit communicatively connected to the at least a secret data extractor wherein the sample identifier circuit is configured to produce at least an output comprising a secure proof of the sample-specific secret.

In another aspect, a method of using the biometric scanner apparatus includes scanning, by a biometric scanner apparatus comprising a biometric sensor, a secret data extractor, and a sample identifier circuit, at least a biological sample, receiving, by the biometric scanner apparatus, and using the biometric sensor, at least a unique biometric pattern from the at least a biological sample, generating, by the biometric scanner apparatus, and using the secret data extractor, a sample-specific secret as a function of the biometric pattern, and producing, by the biometric scanner apparatus, and using the sample identifier circuit, at least an output comprising a secure proof of the sample-specific secret.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
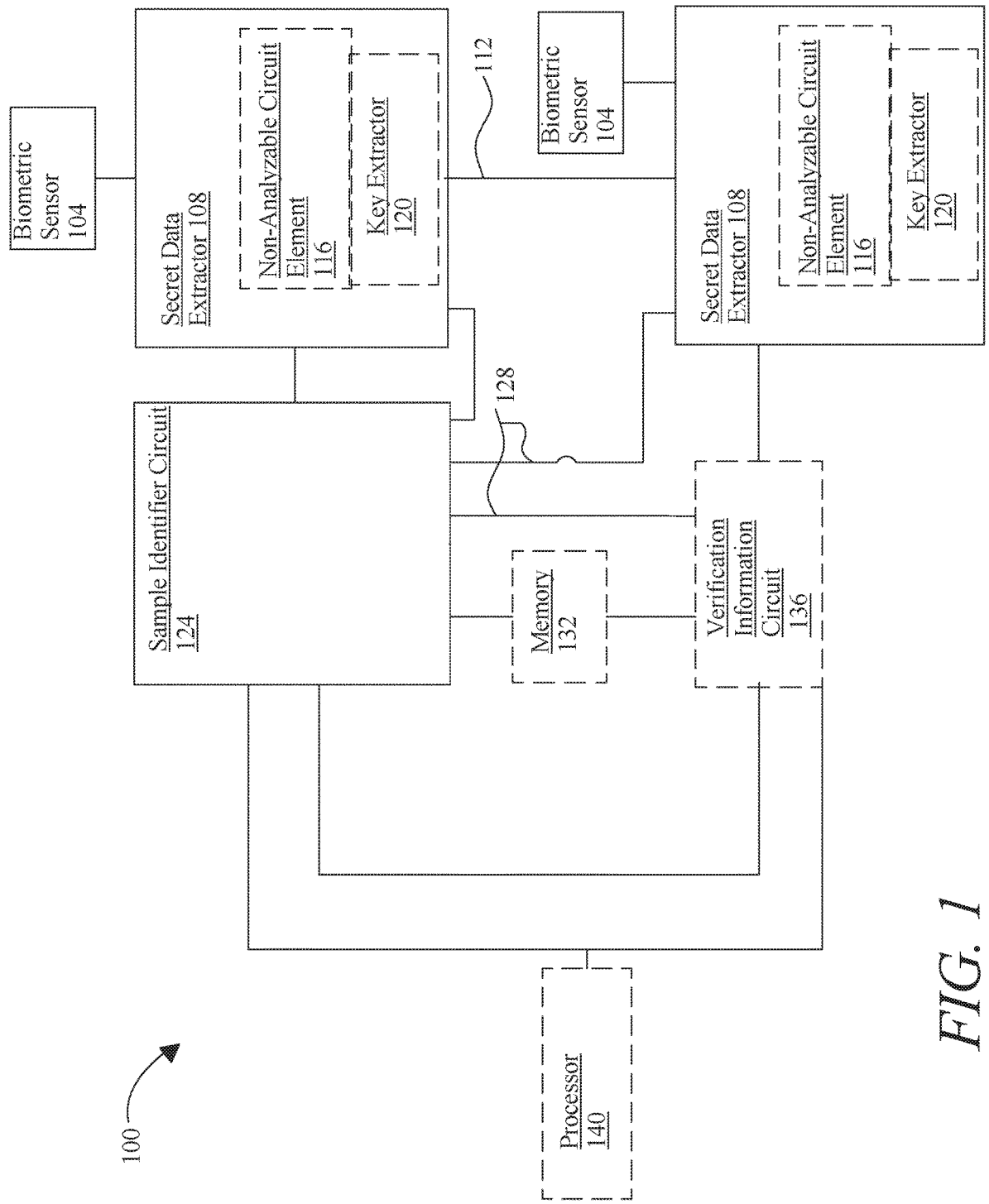
FIG. 1 is a block diagram illustrating an exemplary embodiment of a biometric scanner apparatus.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure are directed to hardware components that perform a biometric scan and generate a secure proof representing a unique biometric pattern of the at least a biological sample. The biometric hardware includes a biometric sensor which captures a unique biometric pattern from a biological sample. The hardware also includes a secret data extractor, which generates a sample-specific secret representing an electrical signal and/or digital representation of the unique biometric pattern. The hardware also includes a sample identifier circuit which produces a secure proof of the sample-specific secret. Composition of such components, and the methods used to produce them, may achieve two goals: creation of a secret identifying only the biological sample in question, which may be known to no device or person outside the component, and a protocol demonstrating, through secure proof, the possession of the secret by the component, without revealing any part of the secret to an evaluating party or device. This may be accomplished by the creation of one or more circuits or electrical components that generate the secret and resist attempts at analysis or probing with electrical devices to uncover the secret. The one or more circuits or components may also be constructed in such a way that even the manufacturer cannot predict outputs; where the outputs in turn are provided according to a secure proof protocol, discovery of the secret using such outputs may also be impossible, defeating spoofing of the biometric identification. Secure proof may be accomplished, among other possibilities, using a digital signature.

In an embodiment, methods and systems described herein may perform and/or implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

As used in this disclosure, "biometric" refers to a unique biological pattern derived from a measurable biological characteristic of a biological sample, which is used for recognition and verification. A biological characteristic may include physiological or anatomical characteristics, including without limitation characteristics detectable by scanning or otherwise analyzing a person's face, palm, vein, fingerprint, iris, retina, hand geometry, finger geometry, tooth shape, ear shape, olfactory characteristics, electrical characteristics, and/or DNA. A biological characteristic may include cardiovascular parameters including heart rate, heart rate variability (HRV), characteristics of the electrocardiogram, blood pressure parameters, characteristics related to autonomic nervous system state, including galvanic skin response (GSR), pupillary response, pupil dilation, pulsatile changes inferable from measurements of the eye or face, including without limitation using Eulerian Video Magnification or other techniques. A biological characteristic may further include neurological state, as detectable via changes in concentrations of oxygenated and deoxygenated hemoglobin, measure of redox states of cytochromes or other correlates of neural activity obtainable via noninvasive means, electroencephalogram (EEG), electromyography (EMG), or other electrical changes related to neural activity, extracellular recordings of neurons, including without limitation via implanted depth electrodes, electrocorticogram (ECoG) via subdural, epidural, and other methods known to those skilled in the art. A biological characteristic may also include behavioral characteristics such as speech, voice, signature, keystroke, gait, eye saccade or other eye movements. The biological characteristics are captured by a biometric sensor that is able to detect a biological sample as described in further detail below.

As used in this disclosure, a biometric sensor may refer to a device that is configured to capture a unique biometric pattern from at least a biological sample. A biometric sensor may include a face scanner, palm scanner, vein scanner, fingerprint scanner, iris scanner, retina scanner, hand geometry scanner, finger geometry scanner, tooth shape scanner, radiographic dental image scanners, ear shape scanner, olfactory scanner, deoxyribonucleic acid (DNA) scanner or analyzer, speech scanner, voice scanner, voice recognition microphones, static signature recognition, dynamic signature recognition, keystroke dynamics recorder, and/or devices to perform movement signature recognition and/or record gait energy images. Biometric sensors may further include a blood pressure monitors, electrocardiogram sensors, video capture devices with appropriate post-processing (for instance for Eulerian Video Magnification or other signal processing methods to infer biometric parameters from video), pulse oximetery sensors, functional near-infrared spectroscopy systems, sensors of skin resistance, conductance, impedance and/or capacitance, external or implantable neural or neuromuscular electrodes, implanted cardiac electrodes and/or any other implanted sensor of electromagnetic, capacitive, inductive or galvanic parameters, and related sensors or sensor arrays. A biometric sensor may incorporate other tools and technologies such as optical imaging, ultrasonic imaging, and capacitance imaging which will be described in more detail below. Measurement of these parameters may be conducted via any means known to those skilled in the art, including in non-limiting examples optical measurement of the face and/or eye, for instance to detect pulsatile changes to the pupil diameter or other parameter, or in the case of a device incorporated into eyewear, an augmented reality (AR) system, a virtual reality (VR) system, a contact lens, or the like.

Referring now to FIG. 1, a block diagram illustrating an exemplary embodiment of a biometric scanner apparatus 100 for securely performing a biometric scan. Biometric scanner apparatus and/or any component thereof may be manufactured, constructed, and/or assembled in any suitable manner, including without limitation using any process, protocol, and/or component as described in U.S. Nonprovisional application Ser. No. 16/506,658, filed on Jul. 9, 2019, and entitled "SECURE COMPUTING HARDWARE APPARATUS AND METHODS OF MANUFACTURING A SECURE COMPUTING HARDWARE APPARATUS," the entirety of which is incorporated herein by reference.

Biometric scanner apparatus 100 includes at least a biometric sensor 104. At least a biometric sensor 104 may include any device configured to acquire the data needed for biometric recognition and verification. In an embodiment, at least a biometric sensor 104 is configured to capture a unique biological pattern from at least a biological sample. At least a biological sample may include, without limitation, an optical tissue scan such as a fingerprint scan, iris scan, retinal scan, or facial recognition scan. At least a biological sample may include an auditory sample such as a recording of a user's voice. At least a biological sample may include a chemical sample such as, without limitation, a sample of a person's DNA. At least a biological sample may include a motion pattern sample, such as a sample of a person's mouse movement, ambulatory gait, signature, or the like. At least a biological sample may include an electric sample, such as, without limitation, a person's skin conductivity, a capacitance of a person's body, or the like. At least a biological sample may include a behavioral biological sample. Behavioral biological samples may include speech, voice, signature, keystroke, and gait.

Still referring to FIG. 1, the at least a biometric sensor 104 may employ the use of tools such as sensors, cameras, microphones, infrared illumination, ultrasound sensors, optical sensors, and/or electrical sensors such as sensor of capacitance or skin conductivity. As a non-limiting example, a biometric sensor capturing a fingerprint sample may use capacitance scanning including capacitive proximity sensors, microcomputers and electrical signal processing circuits to collect data about a fingerprint. In yet another embodiment a biometric sensor capturing an iris sample may use cameras to capture images of the iris and optical sensors using LED light to illuminate the iris. In yet another non-limiting example, voice recognition biometric sensors may use microphones to extract certain characteristics from a user's voice. Another non-limiting example may involve the use of different sensors to capture a user's olfactory biometrics. Sensors to perform such measurements may include conductivity sensors, piezoelectric sensors, metal-oxide-silicon field-effect-transistor, optical fiber sensors, and spectrometry-based sensors. As a further example, at least a biometric sensor 104 may include a camera and image-processing modules to extract unique information from a face scan. In some embodiments, a combination of such tools may be used to further increase accuracy and security. As a further example, at least a biometric sensor 104 may include a sensor designed or configured for processing of electrocardiogram (ECG) signals, EEG signals, implanted electrode signals, and/or combinations thereof.

With continued reference to FIG. 1, signal processing may occur locally via at least a biometric sensor 104 to asses a person's state of stress, e.g. to infer whether the person is under duress, such as without limitation whether they are being forced against their will to enable access to a remote device or data. In non-limiting examples, inference of duress may utilize one or more data sources including without limitation speech data, galvanic skin response, and/or measurements of the autonomic nervous system (for instance by measurement of pupils, pupil response, heart rate, heart rate variability, blood pressure and the like). In the event that multiple persons are required to authenticate access, physical proximity of the persons may be confirmed using capacitive, inductive, galvanic or other couplings between the two devices, for instance upon the persons making physical contact. Raw and/or post-processed signals may be encrypted, and signed with at least a digital signature, and transmitted as proof of person's state.

Still referring to FIG. 1, biometric patterns may include unique biological characteristics, as described above, that may identify and verify the identity of a user. Different biological samples may produce different biometric patterns. For example, biometric patterns of a fingerprint may include features such as arches, whorls, loops, edges, minutiae, and furrows of a user's fingerprints, while biometric patterns from a palm scan may include a user's vein pattern on the user's palm produced by an image of the blood flowing through the vein back to the heart. Biometric patterns may also include the distinct pattern and texture found on a user's iris. Furthermore, biometric patterns may also include distinguishing features on a user's face such as the distance between the eyes, position of cheekbones, jaw line, chin, width of nose, and/or shape of mouth. In an embodiment, a biometric pattern may be unique where a probability of a pattern extracted from a different person and/or at least a biological sample being identical to the biometric pattern is negligible; for instance, a fingerprint or iris scan may be sufficiently unique to a particular person as to make it infeasible that a scan of another person's fingerprint or iris would produce an identical result. Uniqueness may include outputs that are generated from distinctive characteristics from an individual user. Noisy signals from multiple biometrics and/or a biometric, combined, for instance, with a unique passphrase (whether spoken, typed etc.) may be used to generate outputs. Outputs may comprise some number of bits of information that are stable across measurements, as described in more detail below.

With continued reference to FIG. 1, at least a biometric sensor 104 may include an optical device. Scan of biological sample using optical device may be implemented by combining a light source such as lasers with a material that causes unpredictable scattering from the light source; one or more light sensors or light sensor arrays may be used to detect scattered light and output an electrical signal, for instance by generating, at a given light sensor unit, quantized output signal. Alternatively, the output may be binned to a logic 1 signal for detected light above a given threshold intensity or energy content, and a logic 0 signal for detected light below such threshold. Light source may be used to transmit to or through tissue of a user to be identified, so that reflected or transmitted light may be analyzed and used to produce at least a biological sample.

Still referring to FIG. 1, each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1, light sensor may include one or more devices for altering or otherwise affecting light arriving at light sensor. Such devices may include attenuators, which may include any element usable to attenuate a photon stream. Devices may include optical deflectors, including without limitation an acousto-optic deflector; an acousto-optic deflector, also known as an acousto-optic modulator (AOM), is defined herein as a device that modifies power, frequency, or direction of a photon stream in response to an electric signal, using the acousto-optic effect. The acousto-optic effect is an effect whereby the refractive index of a material is modified by oscillating mechanical pressure of a sound wave; the material may include, without limitation, a transparent material such as crystal or glass, through which the light passes. As a non-limiting example, material may be composed in least in part of tellurium dioxide (TeO2), crystalline quartz, fused silica, and/or lithium niobite; the later may be used both as material and as piezoelectric transducer. A soundwave may be induced in the material by a transducer, such as a piezoelectric transducer, in response to an electrical signal; soundwave may have a frequency on the order of 100 megahertz. Frequency and/or direction of travel of refracted light may be modified by the frequency of the soundwave, which in turn may be modified by the electrical signal. As a result, light may be redirected, filtered for frequency, or both as controlled by the electrical signal, enabling acousto-electric deflector to direct a photon stream through a sweep analogous to the sweep through which photocathodes are direct through in a conventional streak camera. Intensity of the transmitted photon stream may further be controlled by amplitude of the sound wave, enabling acousto-optic deflector to vary frequency, direction, and/or intensity of transmitted light. AOM may alternatively or additionally be referred to as a Bragg cell or Bragg grating. Soundwaves may be absorbed at edges or ends of material, preventing propagation to nearby AOMs and enhancing the variability of the induced soundwaves as directed by electrical signals. In addition to by Bragg gratings/AOM, redirection or modulation of photons may be accomplished using apodised gratings, complementary apodised gratings or elements. Optical deflector may receive an electrical signal from an optical deflector circuit, which may be operated by or included in a control circuit as described in further detail below.

As noted above, light sensors may be biased to a point at which a single photon triggers detection, for instance by triggering an avalanche in an APD. Bias may alternatively be set to require a higher threshold for detection and/or to present some finite gain, such as linear gain; in either case, detection may indicate a certain level of intensity and/or energy in the received signal. Threshold intensity may be combined with one or more other signal detection parameters; for instance, a photon detector may be configured to trigger at a given wavelength and/or angle of incidence, and intensity level, such that only light of a particular wavelength and/or angle of incidence at a particular degree of intensity registers as detected. Intensity level may be used to cancel noise in some embodiments; that is, an expected kind of noise, or a kind of noise previously detected by performing one or more detection steps as disclosed herein, may have an intensity below a given threshold, while a desired signal may have an intensity above that threshold, so that setting the intensity threshold may eliminate noise and improve resolution, at least at a particular other parameter such as wavelength and/or detection angle.

Still viewing FIG. 1, light sensor may include at least a device that modulates or affects a signal received at light sensor. For instance, two or more detectors of light sensor may be arrayed in close proximity to each other, with the detectors made sensitive to differing ranges of incident angles. For example, two or more detectors may utilize a diffraction grating to implement incident angle sensitivity. In this scenario, at least three phase ranges may be implemented to reconstruct a three-dimensional view, with averaging over the three nearest phase range detectors to obtain amplitude. Alternatively or additionally, angle sensitivity may be achieved using micro lenses on each detector, or by any other suitable means; persons skilled in the art, upon reading the entirety of this disclosure, will be aware of various elements and techniques for filtering or limiting the angle of incidence of detected signals.

Continuing to view FIG. 1, light sensor may include one or more optical elements causing light sensor to select specific wavelengths of light, either statically or dynamically, e.g. to restrict the fraction of photons arriving at the sensor that arise from ambient light instead of reemitted source photons (via acousto-optical modulator, fixed wavelength sensitive filter, or other, singly or in combination). Alternatively or additionally, different wavelengths may be utilized to discriminate modulation of reemitted photons by wavelength sensitive absorbers (e.g. oxy- vs deoxyhemoglobin, fluorophores and the like) from modulation of reemitted photons by structural components, or other. Light sensor may incorporate wavelength-sensitive masking or other means to spectrally tune the sensitivity of a particular detector to a given range of wavelengths, with peak wavelength sensitivity of the two or more detectors spaced sufficiently far apart to discriminate center wavelength for the given photon count of the desired system. As a non-limiting example, if many photons are counted in aggregate, the standard deviation of the wavelength range may be higher such that the closest two distributions overlap, but sufficient photons are detected to discriminate the two.

With continued reference to FIG. 1, optical elements may perform various other functions or combinations thereof. As a non-limiting example, optical elements may serve the purpose of attenuating intensity of incident photon flux (via variable optical attenuator, neutral density filter or other), e.g. to titrate the total number of photons arriving at detectors 104*a-b* per unit time to avoid saturation; for instance, in a pure time of flight approach, as described in further detail below, the number of photons arriving at the detector may be titrated via optical filters (wavelength selective to minimize saturation by ambient light, and/or amplitude filtering to allow only a fraction of total photon flux through, among others). Light sensor may be electronically gated (in case of SPAD, SiPM and others) to avoid detection of superficially reflected photons. Optical elements may serve to modulate the sensitivity of light sensor to polarization; for instance, and without limitation, optical elements may include one or more polarizing filters. Optical elements may serve to modulate the sensitivity of detector 104*a-b* to incident angle. Optical elements may include an optical gate; for instance the optical path between the light sensor may be intermediated by an optical gate to eliminate or minimize photon arrival at the light sensor while the light sensor is resetting, either to reduce detector-originated jitter, after-pulsing or other effects. In one example, the gate may include an AOM. In another example, the gate may include an electro-optical modulator. In a further example, the gate may include an optical Kerr effect gate. An AOM may be used to modify intensity of transmitted light and/or frequency. In the case of modification of frequency of transmitted light, control circuit, as described in further detail below, may account for an expected shift in direction of transmitted light as resulting from frequency modulation of a soundwave to adjust the frequency of transmitted light. Optical elements may alternatively or additionally include apodised gratings, complementary apodised gratings, fiber Bragg gratings, or the like.

Continuing to view FIG. 1, optical biometric sensor may include an emission source of light and/or photons, such as a laser, LED, or gated photon emission source. One or more pulses of light may include pulses of a specific wavelength; pulses may be coherent or diffuse. Specific wavelength may be in a diffusive range including without limitation the diffusive range of 300-1300 nanometers. At interfaces between media with differing indices of refraction, light may be back reflected and/or reemitted, absorbed, or transmitted deeper into the sample at an angle described by the differences in index of refraction. Alternatively or additionally, source of photons may be a fluorophore, quantum dot, nitrogen vacancy in diamond, other lattice vacancies, or other natural or engineered structure that changes optical properties in response to changes in environment. In such applications, a source of photons to be detected may be excited either by a different wavelength of light, by a change in concentration of an ion, e.g. Ca2+, Mg2+, K+, NA+, by a change in pH, or by some other means, including without limitation matter/antimatter interaction.

Still referring to FIG. 1, circuitry connected to or incorporated in an optical biometric sensor may perform various processing steps to convert a received optical signal or pattern into an electrical signal usable as sample-specific secret. Such processing may include without limitation Fourier analysis of received signals, for instance to determine patterns of received wavelengths; patterns of received wavelengths may be used, as a non-limiting example, to generate a digital output based on received optical signal. For instance, predominating signal frequencies may correspond to high binary values while suppressed signal frequencies may be converted to low binary values. Optical signal values may be assessed by a binning procedure to permit consistent outputs despite minor variations in optical signals; thus, for instance, a light sensor array detecting a scattering pattern may treat slightly variant detected light positions as falling into the same "bin," representing a pixel area of a certain length and width, or other range of distances about a point. Similarly, where a signal to be produced from optical signal depends on a pattern of frequencies, wavelengths, or amplitudes, a range of each such value may correspond to a particular "bin" associated with a particular output bit. Binning may be used to produce consistent outputs which nonetheless depend on random variations in optical signal.

Still referring to FIG. 1, the at least a biometric sensor 104 may be communicatively connected to a secret data extractor 108. As used herein, "communicative connecting" is a process whereby one device, component, or circuit is able to receive data from and/or transmit data to another device, component, or circuit. In an embodiment, communicative connecting includes electrically coupling at least an output of one device, component, or circuit to at least an input of another device, component, or circuit; for instance, communicative connecting may be performed in an embodiment by connecting at least an output terminal of a first component or module to at least an internal input of a second component or module. Communicative connecting may further be performed by creating an optical, inductive, capacitive, or other coupling between a first component or module and a second component or module. Communicative connecting may include placing a first component or module and a second component or module in near-field communication with one another. Communicative connecting may include configuring a first component or module and a second component or module to send and/or receive signals the first component or module and the second component or module. Communicative connecting may include direct or indirect coupling; for instance, at a first component or module may be connected to a second component or module by way of an intermediate circuit. Communicative connecting may be performed via a bus or other facility for intercommunication between elements of a computing device as described in further detail below in reference to FIG. 3. Communicative connecting may include fabrication together on a shared integrated circuit and/or wafer; for instance, and without limitation, any element of apparatus 100 as described herein may be combined with one or more other elements of apparatus 100 in a single monolithic unit or module.

Continuing to refer to FIG. 1, secret data extractor 108 may generate an output element 112 comprising a sample-specific secret, which as used herein is a piece of information uniquely linked to at least a user's biometric pattern, and where uniqueness, as noted above, indicates a very low probability that any other user and/or secret data extractor may generate the sample-specific secret. Secret data extractor may generate an electrical signal and/or digital representation of sample-specific secret. In an embodiment secret data extractor may receive a unique biometric pattern produced or captured by at least a biometric sensor from at least a biological sample of at least a user; the secret data extractor may then output a sample-specific secret produced from at least a biological sample through one or more circuit and/or signal outputs as described in more detail below. In an embodiment, an output including a sample-specific secret may include scans from more than one sample of at least a biometric sample.

With continued reference to FIG. 1, at least a secret data extractor may include one or more circuit elements, including without limitation at least an output element 112; at least an output element 112 may include one or more ports or pins that output data in the form of an electrical signal. Electrical signal may include any constant or variable voltage signal, current signal, or other signal associated with levels or variations of one or more electronic circuit parameters. Electrical signal may include one or more "bits" of a digital signal, including without limitation voltage levels corresponding to "logic 1" and/or "logic 0" as established by upper and lower input or output threshold voltage levels in a digital or logical circuit. At least a secret data extractor 108 may include one or more additional circuit elements; in an embodiment the one or more additional circuit elements may include any component or set of components capable of generating all or part of module-specific secret. As a non-limiting example, at least a secret data extractor 108 may include a digital circuit that, given certain inputs that may be standardized, outputs a secret key of a private key cryptographic system. At least a secret data extractor 108 may include an analog circuit that generates and/or outputs a signal representing or based on sample-specific secret; signal may correspond to one or more digital bits, for instance by matching an upper or lower digital threshold or may be converted to a digital signal using any suitable modality, including digital sampling, analog-to-digital conversion, or the like. As a non-limiting example, analog signal may encode or represent module-specific secret, or a datum based on module-specific secret using one or more attributes of a waveform, which may be periodic or near-periodic; such attributes may include frequency, amplitude, or the like.

Attributes may include a Fourier-series set of predominating periodic frequencies; for instance, a periodic or non-periodic waveform may be decomposed into component frequencies, and some subset thereof, based for instance on relative dominance, may be selected and converted to one or more digital numbers. Outputs of at least a secret data extractor may be subjected to one or more error correction protocols; for instance, outputs may be encoded using error correcting codes, to ensure that signal is consistently encoded in digital form, despite, for instance, small fluctuations in signal. In an embodiment, at least a secret data extractor 108 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; the at least a secret data extractor may have any suitable elements of digital or analog circuitry usable to perform one or more processes as described herein.

Still viewing FIG. 1, in an embodiment, at least a secret data extractor 108 may be received from a third-party manufacturer; third party manufacturer may construct any element suitable for use as the at least a secret data extractor 108 according to any suitable process, including without limitation processes described herein for fabrication of the at least a secret data extractor 108 and/or components thereof. In an embodiment, a first secret data extractor of the sample-specific secret module may be received from a first third-party manufacturer while a second secret data extractor of the sample-specific secret module may be received from a second third-party manufacturer; similarly, a first secret extractor may be received from a first third-party manufacturer while the second is fabricated, for instance as described in further detail below. Various secret data extractors may be combined with each other and/or with other elements of secure computing module as described in further detail below.

With continued reference to FIG. 1, receiving the at least a secret data extractor may further include fabricating the secret data extractor. In an embodiment, fabrication may be performed by assembling one or more electrical components in one or more circuits. Electrical components may include passive and active components, including without limitation resistors, capacitors, inductors, switches or relays, voltage sources, and the like. Electrical components may include one or more semiconductor components, such as diodes, transistors, and the like, consisting of one or more semiconductor materials, such as without limitation silicon, processed with dopants, oxidization, and ohmic connection to conducting elements such as metal leads. Some components may be fabricated separately and/or acquired as separate units and then combined with each other or with other portions of circuits to form circuits. Fabrication may depend on the nature of a component; for instance, and without limitation, fabrication of resistors may include forming a portion of a material having a known resistivity in a length and cross-sectional volume producing a desired degree of resistance, an inductor may be formed by performing a prescribed number of wire winding about a core, a capacitor may be formed by sandwiching a dielectric material between two conducting plates, and the like. Fabrication of semiconductors may follow essentially the same general process in separate and integrated components as set forth in further detail below; indeed, individual semiconductors may be grown and formed in lots using integrated circuit construction methodologies for doping, oxidization, and the like, and then cut into separate components afterwards.

Continuing to refer to FIG. 1, one or more components and/or circuits may be fabricated together to form an integrated circuit. This may generally be achieved by growing at least a wafer of semiconductor material, doping regions of it to form, for instance, npn junctions, pnp junctions, p, n, p+, and or n+ regions, and/or other regions with local material properties, to produce components and terminals of semiconductor components such as base, gate, source and drain regions of a field-effect transistor such as a so-called metal oxide field-effect transistor (MOSFET), base, collector and emitter regions of bipolar junction BJT transistors, and the like. Persons skilled in the art will be aware of various forms or categories of semiconductor devices that may be created, at least in part, by introducing dopants to various portions of a wafer. Further fabrication steps may include oxidization or other processes to create insulating layers, including without limitation at the gate of a field-effect transistor, formation of conductive channels between components, and the like. In some embodiments, logical components may be fabricated using combinations of transistors and the like, for instance by following a complimentary MOSFET (CMOS) process whereby desired element outputs based on element inputs are achieved using complementary circuits each achieving the desired output using active-high and active-low MOSFETS or the like. CMOS and other processes may similarly be used to produce analog components and/or components or circuits combining analog and digital circuit elements. Deposition of doping material, etching, oxidization, and similar steps may be performed by selective addition and/or removal of material using automated manufacturing devices in which a series of fabrication steps are directed at particular locations on the wafer and using particular tools or materials to perform each step; such automated steps may be directed by or derived from simulated circuits as described in further detail below.

With continued reference to FIG. 1, fabrication may include the deposition of multiple layers of wafer; as a nonlimiting example, two or more layers of wafer may be constructed according to a circuit plan or simulation which may contemplate one or more conducting connections between layers; circuits so planned may have any three-dimensional configuration, including overlapping or interlocking circuit portions, as described in further detail below. Wafers may be bound together using any suitable process, including adhesion or other processes that securely bind layers together; in some embodiments, layers are bound with sufficient firmness to make it impractical or impossible to separate layers without destroying circuits deposited thereon. Layers may be connected using vertical interconnect accesses (VIA or via), which may include, as a nonlimiting example, holes drilled from a conducting channel on a first wafer to a conducting channel on a second wafer and coated with a conducting material such as tungsten or the like, so that a conducting path is formed from the channel on the first wafer to the channel on the second wafer. Wafers may be constructed with sufficient thinness to permit VIA-based PUT construction as described in further detail below, VIAs may also be used to connect one or more semiconductor layers to one or more conductive backing connections, such as one or more layers of conducting material etched to form desired conductive paths between components, separate from one another by insulating layers, and connected to one another and to conductive paths in water layers using VI As.

Still referring to FIG. 1, fabrication may include simulation on a computing device, which may be any computing device. Simulation may include, without limitation, generating circuit diagram such as a digital or logical circuit diagram; digital or logical circuit diagram may be used in an automated manufacturing process to print or etch one or more chips and/or integrated circuits. Circuit configurations to hardcode logical or mathematical processes as described below may be simulated prior to physical fabrication; similarly, garbled circuits, circuits generated to instantiate one or more secure multiparty computations as described in further detail below, and/or circuit configurations arranged to make probing or analysis physically infeasible may be simulated, for instance by first generating a simulation of a circuit to produce a desired output and then modifying it according to garbling, secure multiparty computation, or obfuscating protocols to create a second simulation from which the circuit or circuit element may be physically fabricated.

With continued reference to FIG. 1, simulation may be performed in a computer-assisted design (CAD) program. CAD program may include a circuit simulation program and/or a program that permits circuit design, such as without limitation Simulation Program with Integrated Circuit Emphasis (SPICE), products based on SPICE, or similar products. CAD program may support layout of circuits including without limitation printed circuit boards (PCB), and the like. CAD program may support, without limitation, circuit schematic diagram drawing, schematic capture and/or design, printed circuit board (PCB) layout production to include both track and component views manual component placement, automatic component placement, manual and automatic routing of PCB tracks, automated guidance of correct track and pad sizing, automated guidance of requirements for double-sided or multiple circuit boards such as without limitation mother and daughter boards, automated enforcement of one or more design constraints such as, without limitation, a size of a PCB, automated or manual incorporation of test points or test indicators, automated or manual inclusion of mounting holes, automated or manual inclusion of vertical interconnect accesses, automated or manual inclusion of component and/or pin identification, and/or bill of material production. CAD program may include one or more parts or component libraries. CAD program may support generation of export files and/or importation of files, including without limitation Gerber files, Drawing Exchanger Format (DXF) files, intermediate data format (IDF) and related files, comma-separated value (CSV) files, text (TXT) files, and the like. CAD programs may include, without limitation DIPTRACE by Stanislav Ruyev and Victor Savenko of Ukraine, SOLIDWORKS PCB as produced by Dassault Systemes Solidworks Corporation of Waltham, Mass., Altium Designer 17, ULTIBOARD by National Instruments Corporation of Austin, Tex., PCB ARTIST by Advanced Circuits of Aurora, Colo., PCBWEB, believed to be produced by Silicon Frameworks, LLC of Boise Id., BSCH3V by Suigyodo.

Still referring to FIG. 1, CAD program or a similar program may be used to generate and/or design a circuit diagram, to produce a PCB layout, to incorporate components from component or part libraries, or the like. CAD program may be used to generate one or more instructions for printing, etching, assembly, or other automated manufacturing steps to combine or manufacture circuits, including without limitation PCBs, chips, and/or components. For instance, a user may design a circuit topology for the at least a secret data extractor based on an intended output; intended output may include, without limitation, sample-specific secret, a share or hash based on sample-specific secret, a digital signature or proof based on sample-specific secret, or the like.

With continued reference to FIG. 1, simulation may include, without limitation, insertion of one or more components in simulated circuit. One or more components may be inserted, for instance, by retrieval from one or more component libraries; as a non-limiting example, a user may specify that a particular component be inserted at a particular node or connected to one or more wires, by dragging or otherwise copying a visual representation of the component onto the circuit, by selecting one or more nodes or wires and commanding insertion of a component by part number, selection from a dropdown list, or the like, or by any other suitable means. Insertion of a component may include specification of one or more wire or terminal connections. Insertion of a component may include specification of a manner for inclusion in a physical circuit to be manufactured; for instance, insertion may include specification whether the component is to be formed with an integrated circuit via CMOS or similar processes or to be attached to the integrated circuit via soldering or the like after separate acquisition or formation. Components simulated may include analog and/or digital components, including without limitation capacitors, inductors, diodes, triodes, transistors, operational amplifiers, logic gates, multiplexors, demultiplexers, latches, flip-flops, inverters, timers, oscillators, sensors, and/or any other elements suitable for inclusion in any circuit as described herein, which may occur to any person skilled in the art upon review of the entirety of this disclosure.

Still referring to FIG. 1, simulation may involve arranging or transforming circuit topology to conform to one or more components to be manufactured, including one or more integrated or printed circuits. Topology may include two-dimensional topology on a single wafer or three-dimensional topology in which a plurality of circuit elements, loops, or other portions are distributed between two or more stacked wavers and connected using VIAs. Topological arrangements may be subjected to one or more automated constraints; for instance, limitations of the area of wafers or chips, along with footprints of components and/or conductive paths may be simulated to limit the scope of a simulation to a chip and/or integrated circuit that is possible to integrate using existent manufacturing methods. Similarly, components that project from a surface of a chip may be constrained to upper or lower layers of a multilayered construction. Topology may be further transformed or arranged to obfuscate or frustrate analysis through probing; for instance, two or more circuits may be simulated as combined in the same single or multilayered chip, with overlapping portions such that probing would likely connect two unrelated circuits. Persons skilled in the art, upon reviewing the entirety of this disclosure, will be aware of various alternative or additional ways in which circuit topologies may be simulated for purposes described herein.

With continued reference to FIG. 1, one or more circuit simulation steps as described above may be automated; for instance, one or more circuit portions, elements, components, or the like may be automatedly connected in simulated form. Where a circuit or a portion thereof being simulated is a logic circuit, simulation may include generating a set of logic gates to perform logical operations or map inputs to outputs as specified by one or more commands or instructions describing desired sets of inputs and output and/or desired logical operations to be implemented. Obfuscation may include converting a first logic circuit performing a particular input-output mapping into a second circuit or set of circuits accomplishing similar or related mappings of inputs to outputs, for instance to implement a secure multiparty computation circuit as described in further detail below.

In an embodiment, and continuing to refer to FIG. 1, simulation and/or physical manufacture of the at least a secret data extractor may incorporate one or more genuinely random processes, for instance as generated by a unique object (UNO) fingerprint, and/or any other disorder-based security primitive, defined as a function that creates challenge responses from a physical circuit that depend on unique features of that circuit, including without limitation microstructure features or elements that depend on random physical factors occurring or conferred during manufacture. In an embodiment, and as further illustrated below, introduction of random processes into physical fabrication and/or simulation may result in circuit configurations not fully known to a manufacturing entity or device; for instance, a fabrication process introducing one or more random steps may generate a circuit having parameters not fully matching a simulated circuit from which the fabrication is derived.

Still referring to FIG. 1, in an embodiment, at least a secret data extractor 108 may further include at least a non-analyzable circuit element 116. At least a non-analyzable circuit element 116 may include one or more tamper-proofing designs or components to prevent reverse-engineering. For example, at least a non-analyzable circuit element 116 may include at least a circuit element having an output unpredictable by circuit analysis. For instance, and without limitation, at least a non-analyzable circuit element 116 may include metastable elements, such that it is not possible to predict the circuit behavior from a plan of the circuit, without electrically probing the circuit. At least a non-analyzable circuit element 116 may include a circuit element denatured by probing; for instance, one or more instances or subsections of the circuit may be disposed within a three-dimensional chip in a form that makes it infeasible to probe with drilling and/or thinning via chemical-mechanical polishing, grinding, etching or the like, or slicing the chip, and so arrayed that drilling and/or slicing and/or thinning via chemical-mechanical polishing, grinding, etching or the like will destroy the circuit sufficiently to make module-specific secret impossible to recover. Such subsections or instances may include features that are highly vulnerable to fracture under processes used to expose or probe circuit elements, such as chemical mechanical polishing, etching, or the like. In an embodiment, as a non-limiting example, removal of a first layer of a chip containing non-analyzable circuit element may destroy a second layer disposed beneath first layer, for instance by introducing one or more fragile elements that will shatter or crack when chip is exposed to grinding, or one or more regions, pockets, or veins of material that chemically reacts strongly and/or exothermically to etching chemicals. Alternatively or additionally one or more shielding materials may be disposed on an exterior portion of non-analyzable circuit element 116; shielding materials may have a composition that resists analysis and/or penetration. In an embodiment, shielding materials may be adhered to non-analyzable circuit element 116 with a sufficiently strong adhesive to prevent removal without destruction of the non-analyzable circuit element 116. Alternatively or additionally, at least a secret data extractor 108, subcomponents thereof, and/or at least a non-analyzable circuit element 116 may be integrated directly into an integrated circuit (IC) containing other circuit components, including without limitation other circuit components as described herein; this may be implemented, in non-limiting examples, as contiguous functional block within the 3D space of the IC, and/or with fingers interdigitating other logic blocks in the IC, and/or as multiple distinct functional blocks wired together electrically, such that it is infeasible to electrically probe the outputs of at least a secret data extractor 108 via man in the middle or other attacks.

In an embodiment, and with continued reference to FIG. 1, at least a secret data extractor 108b and/or at least a non-analyzable circuit element 116 further may include one or more elements that perform a physically unclonable function; such elements may be referred to herein as PUFs. PUFs generate a "digital fingerprint" that may serve as a unique identity for circuits and semiconductor devices such as a microprocessor. PUFs may be based on physical variations which occur naturally during circuit and semiconductor manufacturing. PUFs may be a physical entity embodied in a physical structure such as an integrated circuit. One or more PUFs may be implemented by various means. In an embodiment, one or more PUFs may include one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold.

Still referring to FIG. 1, at least a secret data extractor 108 may be configured to output a plurality of bits as a function of sample-specific secret. In an embodiment, where at least a sample-specific secret is output from the at least a biological sample, this may be accomplished by outputting one or more bits directly from the at least a biological sample; in embodiments connecting the at least a secret data extractor 108 to other elements according to secret sharing, oblivious transfer, or secure multiparty computation protocols, one or more outputs from the at least a biological sample may connect to a circuit to generate outputs according to such protocols. In some embodiments, the sample-specific secret may include some bits of the at least a biological sample, which may include some unique bits but not necessarily all bits representing the biological sample.

Still referring to FIG. 1, at least a secret data extractor 108 may be configured to output a plurality of bits as a function of sample-specific secret. In an embodiment, and as a non-limiting example, a biometric sensor configured to scan a biological sample of a fingerprint, may produce a unique biometric pattern of a user's fingerprint. At least a secret data extractor may then generate an output including different distinguishing characteristics of arches, whorls, loops outlines of edges, minutiae, and furrows of the user's fingerprint. In yet another example a biometric sensor configured to scan a biological sample of a retina may produce a unique biometric patter of a user's retina. The at least a secret data extractor may then generate an output including a network of blood vessels and capillaries that supply the retina with blood. The output may include specific distinguishing and identifying characteristics that generate a unique output corresponding to an individual user.

With continued reference to FIG. 1, at least a secret data extractor 108 may generate the at least an output including a sample-specific secret that is reproducible. Reproducibility may be achieved using an algorithm, code, biohash and/or vectors that may be applied to the least a biological sample to generate a reproducible output. In an embodiment, a biological sample and/or unique biometric pattern is put through a reproducible code and/or algorithm to generate an output. In an embodiment, a reproducible algorithm such as a hash algorithm may be used to produce a mathematical representation of the biological sample. The hashing algorithm may be a repeatable process so that identical lots of data may produce identical hashes each time they are subjected to a particular hashing algorithm. For example in an embodiment, biological sample "A" would generate output h(A) each time "A" is put through biometric algorithm 1, reproducing the same output. In yet another embodiment, a biological sample such as a fingerprint may produce fuzzy input data when subjected to at least a biometric sensor 104. At least a secret data extractor 108 may then apply a biometric algorithm to the fuzzy input data and generate an outcome. Outcome may be reproducible each time the same fuzzy input data was generated by the at least a biometric sensor. In another non-limiting example, an iris biometric sensor may scan an individual user's iris, creating at least a biological sample of a user's iris. At least a secret data extractor 108 may then segment the biological sample to isolate the iris image from the input image. At least a secret data extractor may then normalize the image to extract user's specific iris dimensions and possibly remove and account for background environmental factors such as amount of light and distance of user from the sensor. Resulting data may then be applied to an algorithm, code, biohash, and/or vectors to produce a reproducible outcome. The same process may then be reproduced for a separate user.

With continued reference to FIG. 1, non-reproducibility may be produced by application of algorithms such as those described above to characteristics of at least a biological sample and/or unique biometric pattern that change with each scan and may be measured by entropy. In an embodiment, non-reproducibility may occur when the same biological input is applied to different algorithms and/or templates, such as algorithms and/or templates that isolate data subject to random variation from one scan of sample to another. In an embodiment, at least a biological sample may generate a non-reproducible pattern with each scan. In some embodiments a non-reproducible pattern may be generated in conjunction with a reproducible pattern and as such may generate a unique secure proof specific to each individual scan. In an embodiment, secret data extractor may generate a first output using reproducible data and a second output using non-reproducible data. This may result in outcomes that vary in a random or pseudorandom manner. In some embodiments non-reproducible aspects of unique biometric pattern and/or at least a biological sample may be overcome with the use of fuzzy data extractors which are described in more detail below.

Continuing to refer to FIG. 1, at least a secret data extractor 108 may generate the at least an output that is unpredictable. Unpredictability may include the unpredictability of hashing algorithms and templates and may be measured by entropy. In an embodiment, unpredictability may occur when the same biological input is applied to different algorithms and/or templates. This may result in unpredictable outcomes, wherein one algorithm may generate one outcome and another algorithm may generate a different outcome, or where a first sample may generate one outcome, and a second sample may generate a distinct outcome, thus creating some level of unpredictability; unpredictability may be caused by uniqueness of unique biometric pattern as described above.

With continued reference to FIG. 1, in yet another embodiment, at least a secret data extractor 108 may generate at least an output that is unpredictable but reproducible to produce identical data by the same subject using identical biometric scans. Certain biometrics such as facial features and fingerprints may yield different outputs for the same user at different times during a user's lifetime. In an embodiment, a fingerprint from a user with dry skin may produce one output, whereas a fingerprint from the same user with enough moisture may produce a different output. This may lead to outputs that are unpredictable. In some embodiments, certain biometric features of a user are more likely to change over time and as such may result in unpredictable outcomes. For example, biometric features such as signature and voice are likely to change over the course of a user's lifetime, and as such may generate unpredictable outcomes for the same user. Biometric features such as face, fingerprint, and hand geometry may not be invariant over the lifespan of a user and may in some instances may be more likely to produce unpredictable outcomes for some users. Biometric features such as iris and retinal are not very likely to vary over the lifespan of a user and may be more likely to produce predictable outputs for a user.

With continued reference to FIG. 1, the at least a secret data extractor 108 may generate the at least an output that is unique to at least a biological sample, as described above. The at least a secret data extractor 108 may then extract information regarding the unique biometric pattern to produce a unique sample-specific secret. In an embodiment, at least a secret data extractor 108 may produce a unique output from a set of one or more minutiae that are sufficient to uniquely identify a user. A different user would generate a different set of minutiae that may generate a unique output based on that user's unique set of minutiae. In yet another embodiment, at least a secret data extractor 108 may produce a unique output from a user's hand geometry which may involve measurement of the human hand such as shape, length, and width of the fingers.

Still viewing FIG. 1, the at least a secret data extractor 108 may include a fuzzy data extractor. A fuzzy data extractor may include a tool that assists in generating a consistent and/or stable output from at least a biological sample. Stability may vary based on use case, measurement, and the like; for instance, whether a reading is susceptible to temperature, ambient light, biological processes or related phenomena and/or variations. A fuzzy data extractor process may determine how stable a particular bit may be; if it is sufficiently stable, that bit may be used in the generation of the uniquely identifying signature. Determination for bit stability may be performed by reference to likely extraction conditions; for example, a bit may be considered sufficiently stable to be useable if it is sufficiently stable over a range of conditions consistent with typical use. Range of conditions consistent with typical use may be described for users and/or engineers analogously to ranges of use for electrical components in datasheets. A fuzzy data extractor may work by recognizing biological sample inputs that are close but not identical to the original one without compromising security. For example, a fuzzy data extractor may extract a uniform and random string R from an input W with a tolerance for noise. If at least a biological sample input changes to W1, meaning input W1 is still close to W, the fuzzy data extractor may recognize this and still generate sample-specific secret output of random string R. Random string R may be generated as the output in this example from input W1 because during an initial computation from biological sample W an output of helper string P may also be generated.

Helper string P may be stored to recover R later. Helper string P may help assist in uncertainty between biological sample W and W1 and may ensure that output R is appropriate. In an embodiment, fuzzy data extractors may convert noisy biometric data (either human or silicon) into string R, which may then be used to generate a private key. In an embodiment, fuzzy data extractors may be constructed through the use of hash functions. In yet another embodiment fuzzy data extractors may utilize an error correcting code in order to have slightly different biometric data still authenticate the same user. In some embodiments fuzzy data extractors may involve the use of fuzzy commitment schemes and/or fuzzy vault schemes.

Still viewing FIG. 1, at least a secret data extractor 108 may include at least a first secret data extractor 108 having at least a first secret share of the sample-specific secret and at least a second secret data extractor 108 having a second secret share of the sample-specific secret. In an embodiment, this may include a sample-specific secret from a first biological sample and a sample-specific secret from a second biological sample, which may be captured using a first biometric sensor of at least a biometric sensor and a second biometric sensor of at least a biometric sensor. As a non-limiting example, a first secret data extractor 108 may generates an output including a first share of sample-specific secret from a retina sample and a second secret data extractor 108 may generate an output including a second share of sample-specific secret from a fingerprint sample. In some embodiments one user may be able to generate a retina sample and a fingerprint sample simultaneously or one after the other. In other embodiments, one user may generate a retina sample while a second user may generate a fingerprint sample simultaneously or one after the other. In an embodiment, biometric scanner apparatus 100 may include a plurality of data extractor modules. Persons skilled in the art, upon reviewing the entirety of this disclosure, will be aware of many different ways in which different biometric sensors and/or samples may produce secret shares that may be combined to produce sample-specific secret, each of which is contemplated as within the scope of this disclosure.

Still viewing FIG. 1, biometric scanner apparatus 100 may include a key extractor 120 connected to the at least a secret data extractor 108 and/or a sample identifier circuit as described in further detail below; the key extractor may be configured to extract a private key from the sample-specific secret. Key extractor 120 may be incorporated in the at least a secure data extractor 108; for instance, the key extractor 120 may convert immediate output from the at least a biological sample into a key in the form of a binary number. At least a key extractor 120 may include, without limitation; a fuzzy extractor; such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Key extractor 120 may extract a symmetric key; for instance, the extractor 120 may extract one or more random numbers based on sample-specific secret to create a symmetric key as described above. Key extractor 120 may alternatively or additionally extract a private key of a public key cryptographic system. Key extractor 120 may be communicatively coupled, as defined below, to any component, module, or circuit incorporated or included in biometric scanner apparatus 100, including without limitation the at least a secret data extractor 108 and/or a sample identifier circuit as described in further detail below.

With continued reference to FIG. 1, key extractor 120 may use a number output by at least a secret data extractor 108 to generate a public and private key pair. For instance, and without limitation, key extractor 120 may use a number output or generated by at least a secret data extractor 108 as a seed in an elliptic curve cryptographic system. In a non-limiting example, module-specific secret may include a random number generated within a desired interval, which may be achieved, for instance, by setting the number of output bits to be provided from secret generator; steps along a chosen elliptic curve may then be performed using random number to generate a public key. Initial point on elliptic curve and elliptic curve may be selected using additional random number, which may be generated using any suitable method; key extractor 120 may discard random numbers associated with curves having known vulnerabilities, which may be provided to the key extractor 120 in memory 132, which is explained in more detail below. In a representative example, key extractor 120 may use as output of secret data extractor 108a public/private key pair. Biometric key derivation and extraction may be performed in a non-limiting example by one or more processes to generate a trusted public key using biometric secret data obtained from biometric sensor 104; this may be obtained from biometric samples in a manner analogous to generation of secret data using a PUF, such as a silicon PUF. Public and private keys may be extracted from sample-specific secret using, for instance, a public/private key derivation such as ED25519 key derivation function to produce a public biometric key and a private biometric key. In an embodiment, key extractor 120 may "sign" public, biometric key; this may be performed using any digital signature based on a secure proof. As a non-limiting example, key extractor 120 may sign public key using a secret stored in or intrinsic to key extractor 120. Secret s may include a secret vector s of a selected length, which will be described for purposes herein as 128 bits but may be any other length; secret may be generated in some cases only once on initial startup of biometric scanner apparatus 100, for instance using one-time fuse circuit, or alternatively may be reproducible. A vector e of bits generated using biometric sample, which may be noisy, may be generated; in an embodiment, an M×128 matrix of bits, A, may be generated by a random-number generator, and a vector b, also of M bits, which may be produced by computing b=As+e, where addition and multiplication are understood to have meanings consistent with vector and matrix-based addition and multiplication as used, for instance, in linear algebra. The vector b may be provided as an alternative or additional secure proof of s and/or e. A and/or b may be publicly available and useable as "helper data." Alternatively or additionally, b and e may be used to produce a secret s' from which public and private keys may be extracted: A may be transformed modified to produce an invertible matrix A', which may be accomplished in a non-limiting example by selecting the N highest-confidence bits of e to produce an N-bit vector e', and discarding low confidence bits, while discarding the rows of A and entries of b (producing b') corresponding to the low confidence bits of e. This process may be repeated until A' is invertible. Where s is not available test may then be performed to ensure using $s'=A'^{-1}(b'-e')$ to determine that b' is within a small edit distance of b″=As′+e; if not, the process may be repeated until true. A cryptographic hash may be produced using s′, and a key extraction process such as but not limited to Ed25519 may be applied to generate a public key and a private key. The above-described consistency check may be used where biometric sample is acquired, to ensure consistency of sampling; private key may then be used to sign and/or generate secure proof of biometric sample, as described in further detail herein. Persons skilled in the art, upon reading the entirety of this disclosure, will be aware of various ways in which a random number may be used to generate a private and public key pair consistently with this disclosure. As a further non-limiting example, key extractor 120 may utilize a numerical output from or generated by at least a secret data extractor 108 to generate an RSA private key; this may be accomplished, for instance, by using numerical outputs from the at least a secret data extractor 108 to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. Key extractor 120 and/or other elements of biometric scanner apparatus 100 may perform alternative or additional secure proofs identifying key extractor 120 and/or other elements of biometric scanner apparatus 100. For instance, and without limitation, key extractor 120 and/or other elements of biometric scanner apparatus 100 may sign a public key produced from the biometric sample with a private key of the key extractor 120 and/or other element of biometric scanner apparatus 100 sensing the biometric sample, as a non-limiting example.

With continued reference to FIG. 1, at least a secret data extractor 108 may include a one-time sample-specific secret, defined herein as a secret generator designed to generate a single secret. One-time secret may, as a non-limiting example, include a single response to a single challenge of a challenge-response pair. As a further example, at least a one-time secret may include a single private key and/or a number usable to generate a private key, for instance via a key extractor.

Still referring to FIG. 1, biometric scanner apparatus 100 includes a sample identifier circuit 124 configured to produce a secure proof of the sample-specific secret, which may be produced at an output 128 of sample identifier circuit 124. Sample identifier circuit 224 may include a programmable module that may be programmed to perform one or more logical and/or computational steps as described in this disclosure; programmable module may include a one-time programmable module such as an FPGA or ROM, or may include a module programmable through software and/or firmware as described in further detail below. Sample identifier circuit 224 may combine hardcoded logic circuitry with one or more programmable modules. A secure proof, as used herein, is a protocol whereby an output is generated that demonstrates possession or "knowledge" of a secret, such as a sample-specific secret, without demonstrating the entirety of the sample-specific secret; in other words, a secure proof by itself, is insufficient to reconstruct the entire sample-specific secret, enabling production of at least another secure proof using sample-specific secret. Where sample-specific secret includes a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, a proof may not be secure; in other words, proof may include a one-time revelation of sample-specific secret, for instance as used in a single challenge-response exchange. At least a secret data extractor 108 may be communicatively connected, as defined above, to at least a sample identifier circuit 124. In a representative example, sample identifier circuit 124 may comprise a cryptographic evaluator in the form of a processor with security protections against software or software and hardware attacks, including without limitation attacks presenting scenarios in which a malicious actor may attempt to extract cryptographic keys for purposes of spoofing the key, to modify computer code, data or memory structures or similar; such protections may include, without limitation, a secure computing module or elements thereof as disclosed in further detail below. Sample identifier circuit 124 may also include public/private key pairs or other cryptographic key pairs such as, without limitation symmetric public keys, elliptic curve-based key pairs or the like, or mechanisms to create them, for purposes of cryptographically authenticating the validity of the cryptographic evaluator to another device, authenticating the validity of secure software loaded onto the device, or other data, including without limitation inputs, outputs, time of loading, and/or time of execution of software, boot sessions, or the like.

With continued reference to FIG. 1, secure proof may be implemented using a digital signature. A digital signature as used herein is a secure proof performed on an element of data, referred to as a "message"; secure proof may include any secure proof as described in this disclosure. Message may include without limitation an encrypted mathematical representation of a file or other set of data. File or set of data may confer credentials, which may demonstrate, without limitation, any result of any authentication or authorization process performed by a signing device. Credentials, which may take the form of authorization tokens, may be generated, conferred, signed, or otherwise manipulated in any suitable way, including without limitation as disclosed in U.S. Provisional Application 62/758,367. Secure proof may be enacted, without limitation, by encrypting message using a private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file. A digital signature may be evaluated in general using a verification datum associated with a secure proof used to generate digital signature. As a further non-limiting example, digital signature may be performed according to any embodiment described in U.S. Provisional Application 62/815,493, filed on Mar. 8, 2019 and entitled "METHODS AND SYSTEMS FOR IMPLEMENTING AN ANONYMIZED ATTESTATION CHAIN," the entirety of which is incorporated by reference herein. As a digital signature may be seen as an implementation of a secure proof upon message, a digital signature may be referred to herein as a form of secure proof, as indicating that the digital signature represents a manner in which a secure proof is being implemented.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA), distributed certificate authority or other is available to verify that the possessor of the private key is a particular entity; thus, if the certificate authority, distributed certificate authority or other may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. Confidence level may be quantified as a dollar value that represents the cost an adversary would expend (in time and money) to compromise a device. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Another embodiment may include BLS signatures or other threshold signature schemes. Certificate authority may include any device and/or devices acting as certificate authorities and/or distributed certificate authorities as disclosed in U.S. Provisional Application 62/758,367, filed on Nov. 9, 2018 and entitled "METHODS AND SYSTEMS FOR A DISTRIBUTED CERTIFICATE AUTHORITY," the entirety of which is incorporated herein by reference. Digital signatures may be performed, without limitation, using any non-interactive zero-knowledge proof; for instance, a proof may be recorded in conjunction with a datum, and a verification may be performed by any party seeking to evaluate the proof.

Still viewing FIG. 1, in some embodiments, systems and methods described herein produce cryptographic hashes, also referred to by the equivalent shorthand term "hashes." Cryptographic hashes may, for instance, be used to create representations of data to be signed with a digital signature. A cryptographic hash, as used herein, is a mathematical representation of a lot of data, such as files or blocks in a block chain; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective. Sample-specific secret, or a datum derived therefrom, may be used as at least a random number to seed and/or pad one or more hashing algorithms.

Still referring to FIG. 1, secure proof generated by the at least a sample identifier circuit 124 may take any other suitable form used in cryptographic systems to demonstrate possession of secret information including without limitation any information that may be used as or derived from sample-specific secret. Such forms may include, for instance, digital fingerprints, watermarks, credentials such as passwords or the like, tokens or any other suitable object that may be exchanged or output to furnish a secure proof.

Still viewing FIG. 1, sample identifier circuit 124 may be configured to perform a direct anonymous attestation protocol. In an embodiment, direct anonymous attestation is an anonymous digital signature scheme, which instead of reliance on a certificate authority to link a particular private key to a particular party, uses reference to a group public key or to multiple public keys to verify an anonymous signature. Sample identifier circuit 124 may act as a "first signer" of a digital signature, signing with a private key produced from a secret generator as described above. In an embodiment sample identifier circuit 124 signs an element of data using the private key. A second signer, which may be sample identifier circuit 124 and/or an additional element coupled thereto, may previously or subsequently sign the element of data or another element linked to the element previously signed; alternatively or additionally, second signer may use information or signature elements provided by the at least a sample identifier circuit 124 and/or the at least a secret data extractor 108 to perform a digital signature. This process may, for instance, enable generation of novel secret keys using additional circuitry, to demonstrate, for instance, timeliness of execution and frustrate delay-based attacks. Direct anonymous attestation may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

Continuing to view FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties.

As another non-limiting example, and further referring to FIG. 1, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup. ZK-STARKS may not rely on private-public key pairings but may rely on collision resistant hashing and a random oracle model. Collision resistant hashing may be measured if it is hard to find two inputs that hash to the same output, that is two inputs such as a and b such that H(a)=H(b), and a≠b. Collision resistant hash functions may include a strong one-way hash function. ZK-STARKS may utilize collision-resistant hash functions to convert a STIK into an interactive argument of knowledge system, whereby a STIK is defined as a Scalable Transparent Interactive Oracle Proof of Knowledge. A ZK-STIK may be proven to be unconditionally sound, even against computationally unbounded provers. If the STIK has perfect ZK, then the argument system has computational ZK. Any realization of a STIK using this technique may be considered interactive. Collision resistance may be desirable for example, when a party may attest to a document by publishing a public key signature on a hash of the document. A malicious actor may be able to get a party to attest to one document and then produce another document copying that attestation thereby producing the same hash and claiming the other party had attested to both documents. Collision resistance hashing may also be employed for example when parties may compare cryptographic of a file to make sure they both have the same version. A bad actor could produce two files each containing the same hash and trick users into believing they had the same version of a file when in fact they did not. ZK-STARKS may also utilize a random oracle model. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and timestamped by a device with trusted properties Using the random oracle model any STIK can be compiled into a non-interactive argument of knowledge in the random oracle knowledge. If the STIK has perfect ZK then the resulting construction has computational zero knowledge. Realization of a STIK using this technique may be considered non-interactive STARK.

In an embodiment, secure proof may include and/or be described as a proof of knowledge. Requirements for proof of knowledge may require one, a threshold number, or all of the provers of knowledge to present information to access the next level of key store access (either intermediate evaluator or end remote key store). Multiple provers at any level may be implemented via key sharding using Shamir's secret sharing algorithm or other key sharding mechanism. Alternatively threshold signatures may be implemented using BLS signatures, ring signatures and the like. In a tiered access setup, it may be desirable to obfuscate the location of the remote data storage device. In non-limiting example, obfuscation of location of the remote key store may be achieved by use of a distributed lookup protocol (e.g. Chord) in which key/data mappings are stored in trusted setups. In an example, the authenticator stage may consist of one "client" prover of knowledge and one or more "custodian" provers of knowledge, for instance in the event access controls are needed, for regulatory compliance in the case of financial institutions providing custody, or any other configuration of more than one prover of knowledge. In an example where a threshold number or the totality of provers of knowledge are required to access, the presentation of knowledge may be required to occur within a specified window of time. In an example the set of provers of knowledge required to access the next level of key store access may be selected at random. Such a mechanism provides additional robustness against targeted attack of provers of knowledge; for instance if a randomly selected specific n of k provers of knowledge is required to access the next stage, rather than any n of k, then the burden for targeted attack becomes greater than n of k. Where k is large, this becomes infeasible. Random selection may be accomplished using any number of mechanisms, including verifiable delay functions (VDFs) in the case where a secure processor is not available, or using a secure processor or other trusted setup and proof of elapsed time (PoET), or other mechanism known to those skilled in the art. We define "trusted setup" to be a computational architecture that provides protections against software attacks in the case of a "software trusted setup", such as without limitation the Sanctum processor from MIT, or "hardware trusted setup" that provides additional protections against physical tampering or espionage, e.g. via power, thermal, or other output patterns. Random selection may be implemented by utilizing a simple bit comparison scheme; for instance, and without limitation, each prover of knowledge may be equipped with a high entropy source, such as without limitation a random number generator (RNG) operating within a trusted setup, and selection amounts to this random source matching some logical operation primitives, whether fixed or variable. In such cases random selection may require "at least n of k" provers.

With continued reference to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, communicative connection may further be performed according to one or more protocols for generation of secure proof. For instance, in an embodiment, one or more computations performed to produce secure proof may be performed using a secure multiparty computation (SMC) protocol. An SMC protocol, as used herein, is a process whereby at least two parties, which may be devices furnishing inputs such as binary inputs, provide inputs to a process that performs a calculation using the inputs to produce a result; each set of inputs is based on a secret possessed by the corresponding party. If each party to a secure multiparty computation submits its inputs according to an assumed set of protocols, then neither party nor any observer to the process can deduce either secret, even given the circuit performing the calculation and both sets of inputs. Inputs may be provided to circuit using, for instance, oblivious transfer protocols, wherein party providing input provides a secret share based on secret to the circuit without being in a position to determine which secret share has been provided. Exemplary secure multiparty computation processes include without limitation the Yao's Garbled Circuits solution to the "millionaire's problem"; persons skilled in the art, upon reviewing the entirety of this disclosure, will be aware of various protocols for implementation of secure multiparty computation that may be applied to perform secure proof as described herein.

With continued reference to FIG. 1, at least a secret data extractor 108, the at least a sample identifier circuit 124, and/or at least a verification information circuit as described below may be communicatively coupled to a memory 132. At least a memory 132 may include one or more elements of read-only memory, one or more elements of execute-only memory, and/or one or more dedicated cache lines or isolated memory. In some embodiments at least a memory 132 may be accessible only to specific elements of biometric scanner apparatus 100.

With continued reference to FIG. 1, sample-specific secret, such as without limitation a private key as described above, is never stored in a memory 132. Biometric scanner apparatus 100 which includes the biometric scanner apparatus may never store sample-specific secret in any memory at all. Sample-specific secret may be extracted and immediately used in a secure proof, without ever being stored in a memory 132 or anywhere in the biometric scanner apparatus or Biometric scanner apparatus 100. An identifiable form of biometric data may also never be stored in memory 132. An identifiable form of biometric data may include but is not limited to a biometric pattern, a sample specific secret, at least an output produced by at least a secret data extractor 108, and/or a private key generated from the sample specific secret. Memory 132 may store the at least a secure proof for output.

Still referring to FIG. 1, biometric scanner apparatus 100 may be configured to implement one or more secure memory storage protocols. One or more secure memory storage protocols may be protocols designed to prevent unauthorized access to memory and/or to protect biometric scanner apparatus 100 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in biometric scanner apparatus 100. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, biometric scanner apparatus 100 may incorporate a memory controller located within the trusted computing boundary to encrypt and authenticate, by a secret key, memory elements such as without limitation memory page tables and/or memory pages accessible by other software elements, such as an operating system. Various techniques, processes, means or elements may be used to implement the above-described secure memory protocols, For instance, biometric scanner apparatus 100 may use hardware-enabled access control to protect memory access; hardware access control may, as a non-limiting example, be performed by tagging each memory entry with a "container identifier" corresponding to a page, file, or other grouping of memory, enabling biometric scanner apparatus 100 to determine whether tampering has occurred. Biometric scanner apparatus 100 may perform one or more safe-sharing protocols for hardware shared with other resources; for instance, where an exception, termination of a programmed process, or other condition causes a secured process to exit, shared registers may be reset to eliminate protected data prior to access by other processes.

With continued reference to FIG. 1, biometric scanner apparatus 100 may operate using one or more dedicated memory objects, registers, or storage elements; as a non-limiting example, biometric scanner apparatus 100 may operate with dedicated cache lines not available to other processes or circuits, preventing, e.g., stack or buffer overrun attacks to corrupt or steal data. Dedicated memory elements may be wired only to biometric scanner apparatus 100; access to dedicated memory elements may be rendered impossible except by way of biometric scanner apparatus 100. Biometric scanner apparatus 100 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described above, including without limitation blockchains and the like. Biometric scanner apparatus 100 may utilize oblivious random-access memory (RAM) wherein memory access patterns are obfuscated to prevent detection of memory access patterns by outside observers attempting to deduce execution details regarding processes performed using biometric scanner apparatus 100. Biometric scanner apparatus 100 and/or device incorporating biometric scanner apparatus 100 may incorporate a trusted non-volatile storage device that provides some means of verification of secure storage capability and other properties. Memory protocols as described above may be used to implement methods of attested storage and the chain of trust beginning at PUF level up through processor 140, memory 132 and code. Such mechanisms may be used to secure long-term storage (e.g. solid-state drives (SSDs), spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with biometric scanner apparatus 100.

Still referring to FIG. 1, biometric scanner apparatus 100 may include a verification information circuit 136. Verification information circuit 136 may be configured to generate verification information to evaluate the sample specific secret, where verification information is defined as additional information that a user or a device may use to evaluate secure proof. In an embodiment, the at least a verification information circuit 136 may generate, as a function of sample-specific secret, a public key; public key may be provided automatically to any querying device. Similarly, verification information may include information used to verify a zero-knowledge proof according to any suitable zero-knowledge proof protocol as described above. Verification information circuit 136 functions to verify information generated by a user so that an observer, who is unaware of the sample-specific secret and will not be privy to the secure proof, can be informed that user is who user claims to be. In an embodiment, verification information circuit 136 functions to convey to observer that user does indeed possess the verified secret.

Still viewing FIG. 1, as an example, secure proof may include a digital signature generated and/or derived from sample-specific secret, including without limitation a digital signature generated using a private key derived from sample-specific secret, and the verification circuit may be further configured to generate a verification datum verifying the digital signature, such as without limitation a public key associated with the private key. Secure proof may be implemented using a challenge-response protocol. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of sample-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem. Challenge may include, or be modified by apparatus 100 to include, a datum usable to indicate freshness of the resulting signature and/or secure proof. Datum may include a secure timestamp as described below, and/or an aspect of at least a biological sample that may be expected to be different each time it is sampled, such as non-reproducible data or outputs from at least a biological sample as described above.

With continued reference to FIG. 1, reproducible and non-reproducible readings generated from the at least a biological sample may be used together with secure timestamps to prevent other parties or devices from copying a previously generated secure proof. For example, a biological sample containing the non-reproducible reading may be made public and may contain a key and/or zero-knowledge proof generated from the reproducible part of the biometric sample. Further, the non-reproducible proof may also contain a secure timestamp. Some non-reproducible parts may also generate a random number or cryptographic nonce to ensure that old biological samples cannot be reused by other individuals. These items, combined together with the non-reproducible biometric sample, may help prevent individuals or devices that do not possess the secret to attempt to spoof a previously used signature, because that signature would be out of date. This may be proven because a timestamp may reflect the exact time and generation of a digital signature and would differ in time and generation in one produced by another individual using the same public reproducible reading.

Still referring to FIG. 1, in an embodiment, any element and/or component of apparatus 100 as described in this disclosure, including without limitation at least a sample identifier circuit 124, verification circuit 132, a self-identifying circuit, and/or at least a key extractor 120 may be constructed with one or more tamper-proofing or obfuscation techniques to defeat invasive or noninvasive analysis thereof. This may be accomplished using any means or method suitable for the generation of the at least a non-analyzable circuit element 116 as described above.

With continued reference to FIG. 1, biometric scanner apparatus 100 may include at least a self-identifying circuit specific to the biometric scanner apparatus. The self-identifying circuit may include PUFs, hardcoded digital signature, and/or private keys to provide a cryptographically strong seed for self-identification of the at least a biometric scanner apparatus. PUFs may be implemented by various means as described above. The at least a biometric scanner apparatus may also include a digital signature, which may be performed using a private key, which is associated with a public key, allowing for self-authentication and identification. The at least a biometric scanner apparatus may contain private keys containing cryptographically secure information that allows the biometric scanner apparatus to self-identify. In some embodiments this may be particularly useful when biometric scanner apparatus 100 consists of a plurality of biometric scanner apparatus. Self-identifying circuit may be implemented using any components and/or protocols suitable for implementation of a device identifier as disclosed in U.S. Nonprovisional application Ser. No. 16/506,658, incorporated by reference above.

Further referring to FIG. 1, apparatus 100 may be configured to generate anonymized signature sets based on any signature generated and/or received by any component of apparatus 100 as described herein. An anonymized signature set may include, without limitation, a modified verification datum based on the verification datum and linked to a secret used to generate the verification datum, including without limitation a sample-specific secret. In an embodiment, it is impossible and/or computationally infeasible for a second device to derive verification datum from modified verification datum. An anonymized signature set may include, without limitation, a modified signature based on signature; the modified signature may include a secure proof of a secret used to generate the signature, such as without limitation the sample-specific secret. It may be impossible and/or computationally infeasible for a second device to derive signature from modified signature. Modified verification datum verifies the modified originating signature. Modified signature may sign a modified message, which may be generated using a message signed by signature. Modified message may reference modified verification datum as described above. It may be impossible and/or computationally infeasible for a second device to derive message signed by original signature from modified message. Any step in generation of anonymized signature set, and/or any component thereof, may be implemented as disclosed in U.S. Provisional Application 62/815,493, which is incorporated by reference above.

With continued reference to FIG. 1, sample identifier circuit may sign a secure timestamp. Sample identifier circuit 124 may generate secure timestamp. Secure timestamp may contain information pertaining to the current moment that a secure proof is generated of the sample-specific secret. In an embodiment, the at least a sample identifier circuit may append a timestamp to the secure proof and sign the secure proof. A secure timestamp generated and signed by the at least an identifier circuit may allow for the secure tracking of and generation of at least a secure proof. This may ensure that the timestamp cannot be altered once it has been generated and signed by the at least an identifier circuit. In an embodiment, a secure timestamp generated and signed by the at least a sample identifier circuit may be completed by a trusted third party. This may be used to prove the existence of certain secure proof before a certain point in time without the possibility that the timestamp can be backdated. In some embodiments, multiple trusted third parties may be used to increase reliability and reduce vulnerability. In some embodiments ANSI ASC X9.95 Standard for trusted timestamps may also be utilized. A timestamp, as used herein, is a cryptographically secure representation reflecting a current moment in time as determined by at least a temporal attester. At least a temporal attester may include a local clock which may be any device used for measurement of time. A timestamp may be created using digital signatures and/or hash functions. In an embodiment, a timestamp may be elements from a hash claim in which a new element containing a hash of previous element and the timestamp is hashed with a regular measurement of time. In an embodiment, a regular measurement of time could be set intervals such as each second or each minute. Secure timestamp may be implemented, without limitation, according to any process and/or using any component as described in U.S. Provisional Application 62/758,367, incorporated by reference above.

Still referring to FIG. 1, at least a sample identifier circuit 124 may be communicatively coupled, to at least a processor 140. At least a processor 140 may include a single processor 140 operating independently, or may include two or more processors 140 operating in concert, in parallel, sequentially or the like; two or more processors 140 may be included together in a single computing device or in two or more computing devices. At least a processor 140 may be an element of, be in communication with, or otherwise be communicatively coupled to one or more elements and/or devices in biometric scanner apparatus 100 such as the at least a memory 132. At least a processor 140 may be or include a cryptographic evaluator.

With continued reference to FIG. 1, at least a processor 140 may include a secure processor 140. Secure processor 140 may operate autonomously from other processors 140 and/or an operating system operating on at least a cryptographic evaluator; for instance, the at least a secure processor 140 may store entries in temporary or the at least a memory 132 in encrypted form, where decryption is impossible without private keys not stored in the at least a memory 132. Encryption may likewise be impossible without private keys available only to processor 140. Processor 140 and/or secure processor may also digitally sign memory 132 entries using, for instance, a private key available only to processor 140. Keys available only to processor 140 may include keys directly encoded in hardware of the processor 140; i.e., a process to digitally sign and/or encrypt using keys may be coded using logic circuits, field-programmable arrays, read-only memory, burning into memory using one-time programmable polysilicon fuses, or the like, and thus be immutable absent physical changes to processor 140. Processor 140 may be constructed, to frustrate alteration and/or probing to discover and/or alter private keys. Private keys may be demonstrable as uniquely associated with processor 140 by use of secure computing module as described above. Alternatively or additionally, a certificate authority as described above, which may be a manufacturer of processor 140, may verify that one or more public keys are associated uniquely with processor 140 according to any protocol suitable for digital certificates. Processor 140 may include, without limitation, a CPU core, an internal bus, and/or a built-in memory, which may be inaccessible to other processors, including without limitation a non-secure or conventional CPU or other processor of a computing device. Writing to memory, where possible, may follow secure memory encryption protocols as described above.

Still referring to FIG. 1, biometric scanner apparatus 100 may include one or more additional elements usable for an authenticator device. Functionally, an authenticator device is meant to convey with strong cryptographic guarantees that the possessor of the authenticator device possesses certain access rights, and/or has a certain identity. The total size of the authenticator device in modern semiconductor technologies makes integration into nearly any form factor feasible. It may be incorporated into a large number of physical device formats, including in nonlimiting examples a key fob, a USB dongle, NFC or related device analogous to two-factor authentication keys, credit card, mobile phone, smart watch, RFID tag or similar, injectable/implantable device, automobile, clothing, jewelry, eyewear, contact lens, hearing aid, around the ear or in ear communication device (e.g. analogous to Apple AirPods) and the like. In the injectable form factor the authenticator additionally includes a means of wireless communication to an external reader/repeater device to connect to remote secure processors (intermediate evaluator or remote key storage in the diagram below). These communications methods may include near-field RF, far-field RF, ultra-wide band and other methods of coupling between two devices via electromagnetic fields, infrared optical links, capacitive, inductive or galvanic coupling, and the like. The injectable/implanted device form factor may be powered externally by the reader device (e.g. passive RFID or any wireless powering implementations based upon the electromagnetic or optical methods described above for communication), may contain a power source, or may generate its own power from in nonlimiting examples chemical (for instance a glucose fuel cell or related), thermal, mechanical, or electromagnetic scavenging energy harvesting. The set of communications and powering methods described above may be mapped to any other device integration target described above. The minimal authenticator system described above may be further improved by incorporating means of providing a software and/or hardware signature of authenticity of data conferring unique personally authenticating credentials. This information may be utilized in an attestation chain using remote or anonymous attestation as described elsewhere. Effectively, this incorporation of personally authenticating credentials with the physical device attestation described elsewhere allows a full chain of attestation from a person or persons and their assets in a fully anonymous, cryptographically strong fashion.

Figure 2:
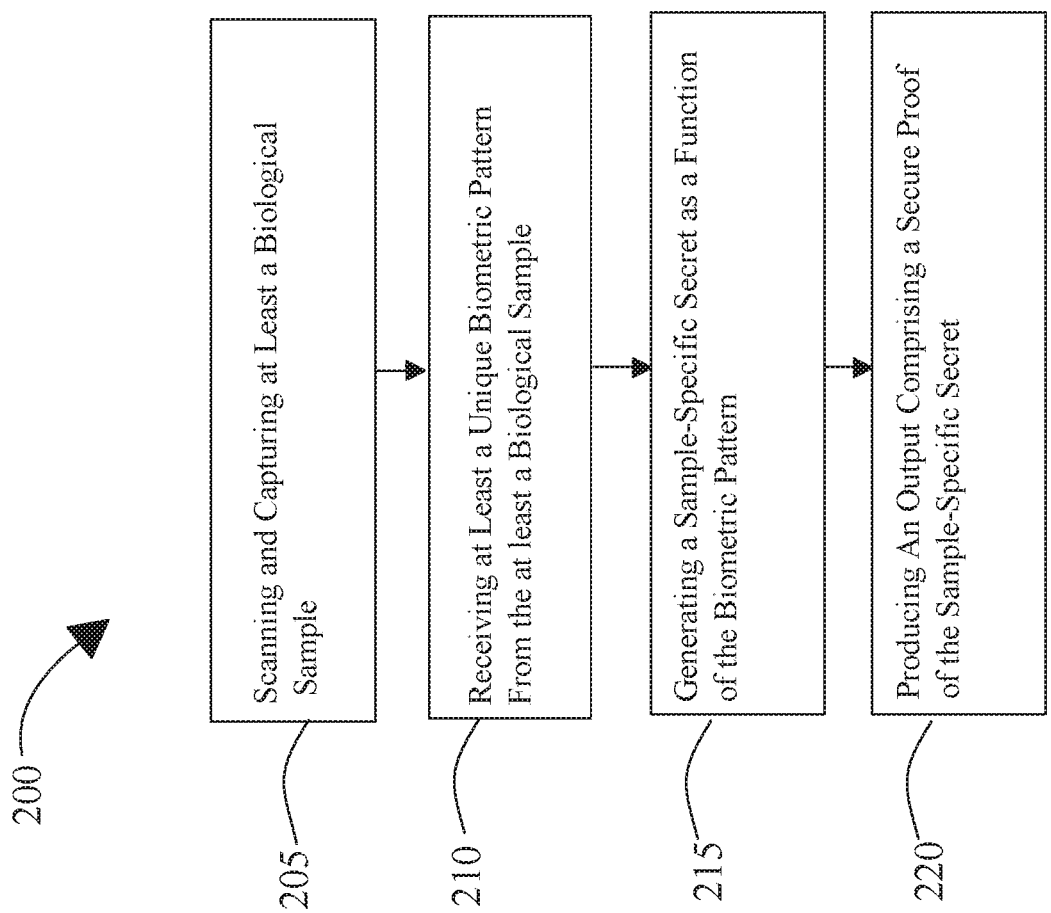
FIG. 2 is a flow diagram illustrating an exemplary method of using a biometric scanner apparatus.

Referring now to FIG. 2, an exemplary embodiment of a method 200 of using a biometric scanner apparatus is illustrated. At step 205, a biometric scanner apparatus comprising a at least a biometric sensor 104, a secret data extractor 108, and a sample identifier circuit 124 captures at least a biological sample. This may be performed as described above in reference to FIG. 1.

With continued reference to FIG. 2, scanning may include capturing images of biological samples. As a non-limiting example, scanning may employ the use of biometric sensors that may assist in capturing images of biological samples. Scanning may include using other tools and technologies such as optical imaging, ultrasonic imaging, capacitance imaging, galvanic skin response, cameras, microphones, computers, tablets, mobile device, desktop device and phones. In some embodiments, a plurality of devices and tools may be used in scanning. In an embodiment, scanning a fingerprint may involve optical fingerprint imaging, ultrasonic imaging, and capacitance imaging. In yet another embodiment, scanning an iris may involve video cameras and infrared illumination to produce an image of a user's iris. In yet another embodiment scanning a user's voice may involve a microphone and audio filters to produce an image of a user's speech patterns.

With continued reference to FIG. 2, at step 210, biometric scanner apparatus receives at least a unique biometric pattern from the at least a biological sample using the biometric sensor. This may be implemented according to any process and/or using any embodiment of any apparatus as described above in reference to FIG. 1. Receiving may involve data collected from the at least a biometric sensor of the at least a biological sample being conveyed to the at least a biometric scanner apparatus. In an embodiment, receiving a unique biometric pattern by the biometric scanner apparatus may occur instantaneously particularly when the at least a biometric scanner apparatus is directly connected to the at least a biometric sensor. In an embodiment, the at least a biometric scanner apparatus may contain at the same physical location the at least a biometric sensor. In an embodiment, the biometric scanner apparatus may receive a fingerprint scan consisting of a unique layout of 10-12 minutiae on user's fingerprint, uniquely identifying a user. A different user may produce a different biometric pattern based on that user's layout of minutiae on a fingerprint. In yet another embodiment, the biometric scanner apparatus may receive an iris scan consisting of unique rings, furrows, and freckles representing that user's iris. A different user would trigger a different set of rings, furrows, and freckles and may ultimately produce a unique biometric pattern representing that specific user's iris. In yet another embodiment, the biometric scanner apparatus may receive a hand geometry scan consisting of shape, length, and width of the user's hand.

With continued reference to FIG. 2, at step 215 the secret data extractor generates a sample-specific secret as a function of the biometric pattern. This may be implemented according to any process and/or using any embodiment of any apparatus as described above in reference to FIG. 1. A sample-specific secret may refer to a digital representation of one or more unique biometric patterns produced from at least a biological sample. In an embodiment, a vein scan produced from a user's vein may be converted into a sample-specific secret of that user's vein. A user's sample-specific secret may consist of a digital representation of the patterns of blood vessels heading towards user's heart taken from user's wrist. In yet another embodiment, a face scan produced from a user's face may be converted into a sample-specific secret of that user's face. A user's sample-specific secret may consist of a digital representation of user's size, position, and/or shape of eyes, nose, cheekbones, and jaw.

Continuing to refer to FIG. 2, generating a sample-specific secret may involve the use of algorithms and codes to generate from the biometric pattern a sample-specific secret. In an embodiment, the at least a secret data extractor may generate a sample-specific secret using a digital circuit that, given certain inputs that may be standardized, output a secret key of a private key cryptographic system. The at least a secret data extractor may include an analog circuit that generates and/or outputs a signal representing or based on at least a sample-specific secret; signal may correspond to one or more digital bits, for instance by matching an upper or lower digital threshold or may be converted to a digital signal using any suitable modality, including digital sampling, analog-to-digital conversion, or the like. As a non-limiting example, analog signal may encode or represent sample-specific secret, or a datum based on sample-specific secret using one or more attributes of a waveform, which may be periodic or near-periodic; such attributes may include frequency, amplitude, or the like. Attributes may include a Fourier-series set of predominating periodic frequencies; for instance, a periodic or non-periodic waveform may be decomposed into component frequencies, and some subset thereof, based for instance on relative dominance, may be selected and converted to one or more digital numbers.

With continued reference to FIG. 2, at step 220 an output comprising a secure proof of the sample-specific secret is produced by the sample identifier circuit. This may be implemented according to any process and/or using any embodiment of any apparatus as described above in reference to FIG. 1. A secure proof, as used herein, is a protocol whereby an output is generated that demonstrates possession of a secret, such as a sample-specific secret, without demonstrating the entirety of the sample-specific secret; in other words, a secure proof by itself, is insufficient to reconstruct the entire sample-specific secret, enabling the production of at least another secure proof using sample-specific secret.

With continued reference to FIG. 2, producing a secure proof of the sample-specific secret may involve the use of direct anonymous authentication, zero-knowledge proof, and/or optical PUF techniques, for example as described above in reference to FIG. 1. In an embodiment, direct anonymous authentication is an anonymous digital signature scheme, which instead of reliance on a certificate authority to link a particular private key to a particular party, uses reference to a group public key or to multiple public keys to verify an anonymous signature. In an embodiment, direct anonymous authentication may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. In an embodiment, an optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 3:
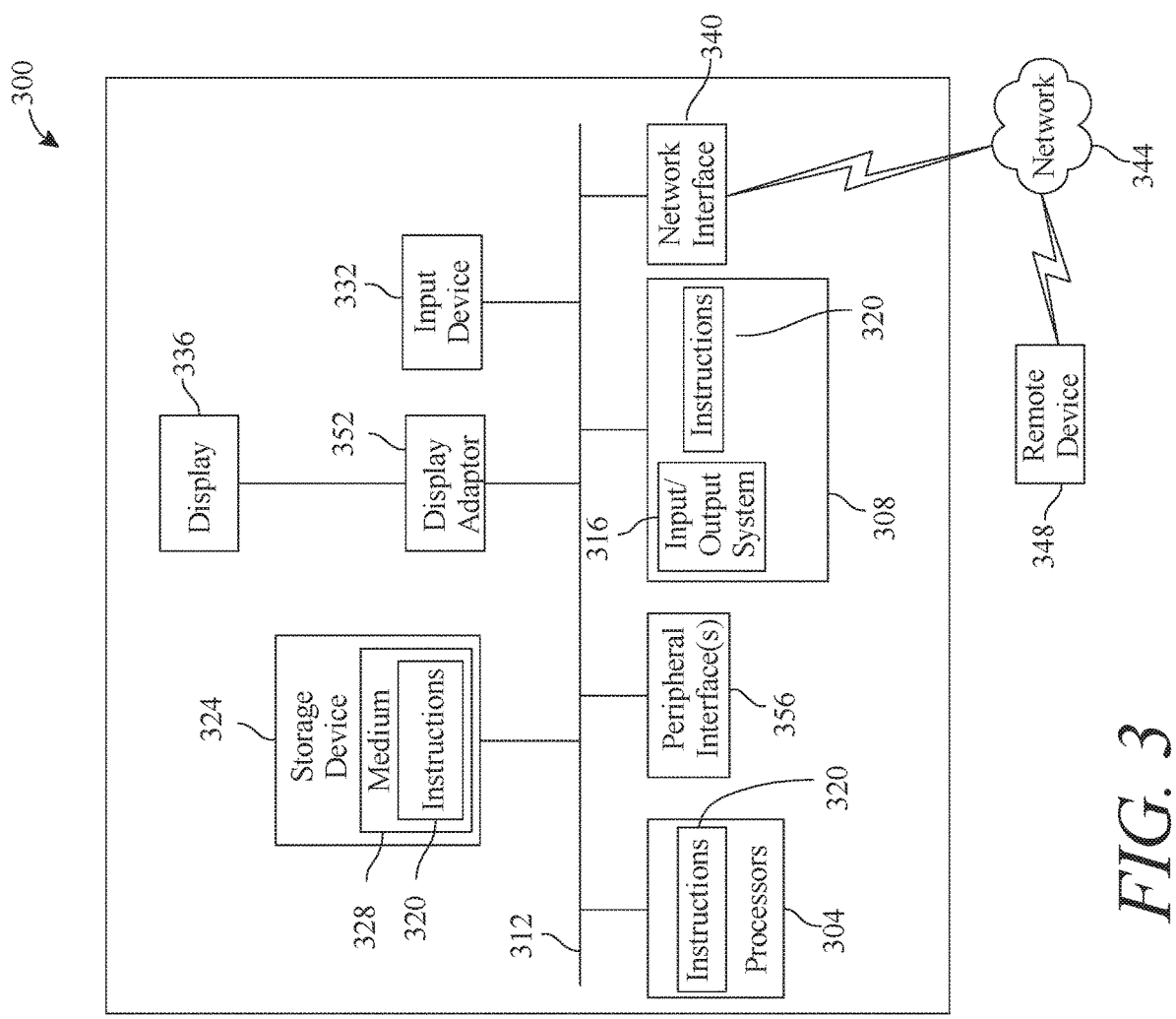
FIG. 3 is a block diagram of a computing system that can be used to implement any one or more of the methodologies disclosed herein and any one or more portions thereof.

Referring now to FIG. 3, a block diagram of a computing system that can be used to implement any one or more of the methodologies disclosed herein and any one or more portions thereof. FIG. 3 shows a diagrammatic representation of one embodiment of a computing device in the exemplary form of a computer system 300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 300 includes a processor 304 and a memory 308 that communicate with each other, and with other components, via a bus 312. Bus 312 may include any of several types of bus structures including, but not limited to, a memory bus, a memory controller, a peripheral bus, a local bus, and any combinations thereof, using any of a variety of bus architectures.

With continued reference to FIG. 3, memory 308 may include various components (e.g., machine-readable media) including, but not limited to, a random-access memory component, a read only component, and any combinations thereof. In one example, a basic input/output system 316 (BIOS), including basic routines that help to transfer information between elements within computer system 300, such as during start-up, may be stored in memory 308. Memory 308 may also include (e.g., stored on one or more machine-readable media) instructions (e.g., software) 320 embodying any one or more of the aspects and/or methodologies of the present disclosure. In another example, memory 308 may further include any number of program modules including, but not limited to, an operating system, one or more application programs, other program modules, program data, and any combinations thereof.

Computer system 300 may also include a storage device 324. Examples of a storage device (e.g., storage device 324) include, but are not limited to, a hard disk drive, a magnetic disk drive, an optical disc drive in combination with an optical medium, a solid-state memory device, and any combinations thereof. Storage device 324 may be connected to bus 312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 324 (or one or more components thereof) may be removably interfaced with computer system 300 (e.g., via an external port connector (not shown)). Particularly, storage device 324 and an associated machine-readable medium 328 may provide nonvolatile and/or volatile storage of machine-readable instructions, data structures, program modules, and/or other data for computer system 300. In one example, software 320 may reside, completely or partially, within machine-readable medium 328. In another example, software 320 may reside, completely or partially, within processor 304.

Computer system 300 may also include an input device 332. In one example, a user of computer system 300 may enter commands and/or other information into computer system 300 via input device 332. Examples of an input device 332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 332 may be interfaced to bus 312 via any of a variety of interfaces (not shown) including, but not limited to, a serial interface, a parallel interface, a game port, a USB interface, a FIREWIRE interface, a direct interface to bus 312, and any combinations thereof. Input device 332 may include a touch screen interface that may be a part of or separate from display 336, discussed further below. Input device 332 may be utilized as a user selection device for selecting one or more graphical representations in a graphical interface as described above.

A user may also input commands and/or other information to computer system 300 via storage device 324 (e.g., a removable disk drive, a flash drive, etc.) and/or network interface device 340. A network interface device, such as network interface device 340, may be utilized for connecting computer system 300 to one or more of a variety of networks, such as network 344, and one or more remote devices 348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 344, may employ a wired and/or a wireless mode of communication. In general, any network topology may be used. Information (e.g., data, software 320, etc.) may be communicated to and/or from computer system 300 via network interface device 340.

Computer system 300 may further include a video display adapter 352 for communicating a displayable image to a display device, such as display device 336. Examples of a display device include, but are not limited to, a liquid crystal display (LCD), a cathode ray tube (CRT), a plasma display, a light emitting diode (LED) display, and any combinations thereof. Display adapter 352 and display device 336 may be utilized in combination with processor 304 to provide graphical representations of aspects of the present disclosure. In addition to a display device, computer system 300 may include one or more other peripheral output devices including, but not limited to, an audio speaker, a printer, and any combinations thereof. Such peripheral output devices may be connected to bus 312 via a peripheral interface 356. Examples of a peripheral interface include, but are not limited to, a serial port, a USB connection, a FIREWIRE connection, a parallel connection, and any combinations thereof. The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention. Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A biometric scanner apparatus, the biometric scanner apparatus comprising:
   at least a biometric sensor, the at least a biometric sensor configured to scan at least a biological sample and receive a unique biometric pattern;
   a secret data extractor, wherein the secret data extractor is configured to receive the unique biometric pattern from the biometric sensor and generate an output comprising a sample-specific secret, wherein the secret data extractor comprises at least a non-analyzable circuit element, wherein the at least a non-analyzable circuit element further comprises a circuit element having an output unpredictable by circuit analysis;
   a sample identifier circuit communicatively connected to the secret data extractor wherein the sample identifier circuit is configured to produce at least an output comprising a secure proof of the sample-specific secret; and
   a key extractor communicatively connected to the secret data extractor and the sample identifier circuit, wherein the key extractor is configured to extract a private key from the sample-specific secret.

2. The apparatus of claim 1, wherein the at least a biometric sensor is configured to detect identifying physiological characteristics.

3. The apparatus of claim 1, wherein the secret data extractor is further configured to output a plurality of bits as a function of the sample-specific secret.

4. The apparatus of claim 1, wherein the at least a non-analyzable circuit element further comprises a circuit element denatured by probing.

5. The apparatus of claim 1, wherein the secret data extractor further comprises a fuzzy data extractor.

6. The apparatus of claim 1, wherein the secret data extractor further comprises at least a first data secret extractor module extracting at least a first secret share of the sample-specific secret and at least a second data secret extractor module extracting a second secret share of the sample-specific secret.

7. The apparatus of claim 1, wherein the private key is never stored in memory.

8. The apparatus of claim 1, wherein the sample identifier circuit further comprises an element that implements a zero-knowledge proof.

9. The apparatus of claim 1 further comprising a verification information circuit communicatively connected to the secret data extractor, wherein the verification information circuit is configured to generate verification information to verify the secure proof.

10. The apparatus of claim 9, wherein:
    the secure proof is a digital signature generated from the sample specific secret and signing a message; and
    the verification information circuit is further configured to generate a verification datum associated with the digital signature.

11. The apparatus of claim 10, wherein the apparatus is further configured to generate an anonymized signature set, wherein the anonymized signature set further comprises:
    a modified verification datum based on the verification datum and linked to the sample-specific secret;

a modified signature, wherein the modified signature comprises a secure proof of the sample-specific secret, and the modified signature signs a modified message referencing the modified verification datum;

wherein the modified verification datum verifies the modified signature.

12. The apparatus of claim 11, wherein the verification datum cannot be derived from the modified verification datum by a second device.

13. The apparatus of claim 11, wherein the digital signature cannot be derived from the modified signature by a second device.

14. The apparatus of claim 11, wherein the message cannot be derived from the modified message by a second device.

15. The apparatus of claim 1 further comprising a self-identifying circuit specific to the biometric scanner apparatus.

16. The apparatus of claim 15, wherein the self-identifying circuit is further configured to generate a secure timestamp.

17. A method of using biometric scanner apparatus, the method comprising:

scanning, by a biometric scanner apparatus comprising a biometric sensor, a secret data extractor, and a sample identifier circuit, at least a biological sample;

receiving, by the biometric scanner apparatus, and using the biometric sensor, at least a unique biometric pattern from the at least a biological sample;

generating, by the biometric scanner apparatus, and using the secret data extractor, a sample-specific secret as a function of the biometric pattern, wherein the secret data extractor comprises at least a non-analyzable circuit element, wherein the at least a non-analyzable circuit element further comprises a circuit element having an output unpredictable by circuit analysis;

producing, by the biometric scanner apparatus, and using the sample identifier circuit, at least an output comprising a secure proof of the sample-specific secret; and extracting a private key from the sample-specific secret through a key extractor communicatively connected to the secret data extractor.

* * * * *